(12) United States Patent
Nagata et al.

(10) Patent No.: US 9,166,520 B2
(45) Date of Patent: Oct. 20, 2015

(54) RANGE SWITCHING DEVICE

(71) Applicant: DENSO CORPORATION, Kariya, Aichi-pref. (JP)

(72) Inventors: Hiromitsu Nagata, Nagoya (JP); Jun Yamada, Nagoya (JP); Kazuhiro Yoshida, Tokoname (JP)

(73) Assignee: DENSO CORPORATION, Kariya (JP)

( * ) Notice: Subject to any disclaimer, the term of this patent is extended or adjusted under 35 U.S.C. 154(b) by 34 days.

(21) Appl. No.: 14/149,369

(22) Filed: Jan. 7, 2014

(65) Prior Publication Data

US 2014/0210395 A1 Jul. 31, 2014

(30) Foreign Application Priority Data

Jan. 25, 2013 (JP) ................................. 2013-011607

(51) Int. Cl.
*G05D 3/00* (2006.01)
*H02P 31/00* (2006.01)
*H02P 17/00* (2006.01)
*F16H 61/32* (2006.01)
*F16H 59/08* (2006.01)
*F16H 61/24* (2006.01)
*F16H 61/28* (2006.01)

(52) U.S. Cl.
CPC ................ *H02P 31/00* (2013.01); *F16H 61/32* (2013.01); *H02P 17/00* (2013.01); *F16H 59/08* (2013.01); *F16H 2061/247* (2013.01); *F16H 2061/283* (2013.01); *F16H 2061/326* (2013.01)

(58) Field of Classification Search
CPC ........................... H02H 7/0851; H02H 7/0853
USPC ........ 318/466, 468, 461, 369, 18; 477/77, 78; 74/473.1, 473.21, 473.12, 469, 473.24; 701/51, 55, 53, 60, 67, 68
See application file for complete search history.

(56) References Cited

U.S. PATENT DOCUMENTS

| 7,075,259 | B2 * | 7/2006 | Nakai et al. .................... 318/432 |
| 7,442,147 | B2 * | 10/2008 | Matsuzaki et al. ............. 477/107 |
| 7,946,957 | B2 * | 5/2011 | Kimura et al. ................. 477/111 |
| 8,068,965 | B2 * | 11/2011 | Kubonoya et al. .............. 701/59 |
| 8,072,168 | B2 * | 12/2011 | Kimura et al. ................. 318/466 |
| 8,494,734 | B2 * | 7/2013 | Ueno ............................... 701/58 |
| 8,620,542 | B2 * | 12/2013 | Ueno et al. ...................... 701/55 |
| 2003/0222617 | A1 | 12/2003 | Nakai et al. |

OTHER PUBLICATIONS

Office Action (1 page) dated Dec. 16, 2014, issued in corresponding Japanese Application No. 2013-011607 and English translation (2 pages).

* cited by examiner

*Primary Examiner* — Rita Leykin
(74) *Attorney, Agent, or Firm* — Nixon & Vanderhye P.C.

(57) ABSTRACT

A range switching device may switch a shift range despite resetting and restarting of a controller. When the controller is reset and restarted during a switching operation of the shift range and the shift range before or after being switched is a P range, the controller controls a motor to rotate the motor until a range switching mechanism abuts against a first limit position of a movable range of the range switching mechanism and learns a rotation position of the motor as a reference position of the motor. When the shift ranges before and after being switched are the ranges other that the P range, the controller controls the motor to rotate until the range switching mechanism abuts against a second limit position of the movable range and learns the rotation position of the motor as the reference position.

4 Claims, 4 Drawing Sheets

|  |  | SHIFT RANGE AFTER BEING SWITCHED ||||
|  |  | P | R | N | D |
| --- | --- | --- | --- | --- | --- |
| SHIFT RANGE BEFORE BEING SWITCHED | P |  | P RANGE WALL | P RANGE WALL | P RANGE WALL |
|  | R | P RANGE WALL |  | D RANGE WALL | D RANGE WALL |
|  | N | P RANGE WALL | D RANGE WALL |  | D RANGE WALL |
|  | D | P RANGE WALL | D RANGE WALL | D RANGE WALL |  | ial
RANGE SWITCHING DEVICE

CROSS REFERENCE TO RELATED APPLICATION

This application is based on and incorporates herein by reference Japanese Patent Application No. 2013-011607 filed on Jan. 25, 2013.

TECHNICAL FIELD

The present disclosure relates to a range switching device that switches a shift range by using a motor as a driving force for driving the device.

BACKGROUND

In recent years, manual operations of apparatuses within vehicles, as well as in other devices, are increasingly being replaced by motor-driven operations that utilize electric motors. Motor-driven operations provide many benefits, such as space-savings, ease of assembly, improved controllability and the like. The replacement of an automatic transmission range switching mechanism within a vehicle is an example of such a replacement from manual operation to motor-driven operation. Such a mechanism is equipped with an encoder that is synchronized with the motor and outputs a pulse signal at every given angle of rotation of the motor. In operation, during a range switching (i.e., when a gear shift position of the automatic transmission is changed), the motor is driven to a target rotation position corresponding to a target shift range based on a count value (hereinafter referred to as "an encoder count value") of the pulse signal of the encoder and the automatic transmission is shifted to the target shift range.

For example, a patent document 1 (i.e., Japanese Patent Laid-Open No. 2004-56858 A) discloses a system having a controller with a nonvolatile memory that stores a target rotation position. After turning on or resetting the controller, the controller sets the target rotation position stored in the memory as a start-up target rotation position. As a result, even when the controller is reset due to, for example, a momentary voltage drop, signal noise or the like, the target rotation position does not change before and after the reset of the controller.

However, when a reset of the controller occurs during the switching operation of the shift range, an encoder count value, a reference position, or the like that is stored within RAM is also reset. As such, the encoder count value for rotating the motor is no longer stored when the controller is restarted. Therefore, although the target rotation position (e.g., the start-up target rotation position) is determined at the restart of the controller, the rotation position of the motor is unknown. Thus, it may be impossible to switch the shift range and to control the motor after the reset of the controller.

SUMMARY

It is an objective of the present disclosure to provide a range switching device capable of properly switching a shift range despite a resetting and restarting of a controller during a switching operation of the shift range.

According to an aspect of the present disclosure, a range switching device, including a range switching mechanism that switches a shift range between a plurality of shift ranges including a P range, a motor driving the range switching mechanism to switch the shift range between one of the plurality of shift ranges, an encoder sensing a rotation of the motor and outputting a pulse signal in synchronization with the rotation of the motor, and a controller that controls the motor to be rotated to a rotation position corresponding to a target shift range based on a count value of the outputted pulse signal of the encoder and causes the range switching mechanism to switch the shift range to the target shift range. When the controller is reset and restarted during a switching operation of the shift range, the controller (i) sets a limit position of a movable range of the range switching mechanism to either of a first limit position corresponding to the P range or a second limit position corresponding to a range opposite to the P range, based on the shift range before and after being switched, (ii) controls the motor to rotate until the range switching mechanism abuts against the limit position, and (iii) learns the rotation position of the motor as a reference position when the range switching mechanism abuts against the limit position.

As mentioned above, even when the controller is reset and restarted during the switching operation of the shift range, the controller controls the motor to rotate until the range switching mechanism abuts against the limit position and learns (i.e., recognizes or establishes) the rotation position of the motor as the reference position when the range switching mechanism abuts against the limit position. Therefore, even when the controller is reset and restarted during the switching operation of the shift range, it is possible to control an amount of rotation (i.e., a rotational angle) of the motor, and thus, it is possible to restart switching of the shift range (i.e., controlling the motor).

Furthermore, when the controller is reset and restarted during the switching operation of the shift range, the controller sets the limit position to either of the first limit position corresponding to the P range and the second limit position corresponding to the range opposite to the P range based on the shift range before and after being switched. That is, since the controller considers the shift range before and after being switched, it is possible to prevent the vehicle from behaving contrary to an intention of the driver and making the driver uncomfortable.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

An exemplar embodiment of the present disclosure with reference to FIGS. 1-5 is described hereinafter. First, a configuration of a range switching mechanism 11 will be described based on FIGS. 1 and 2.

Figure 1:
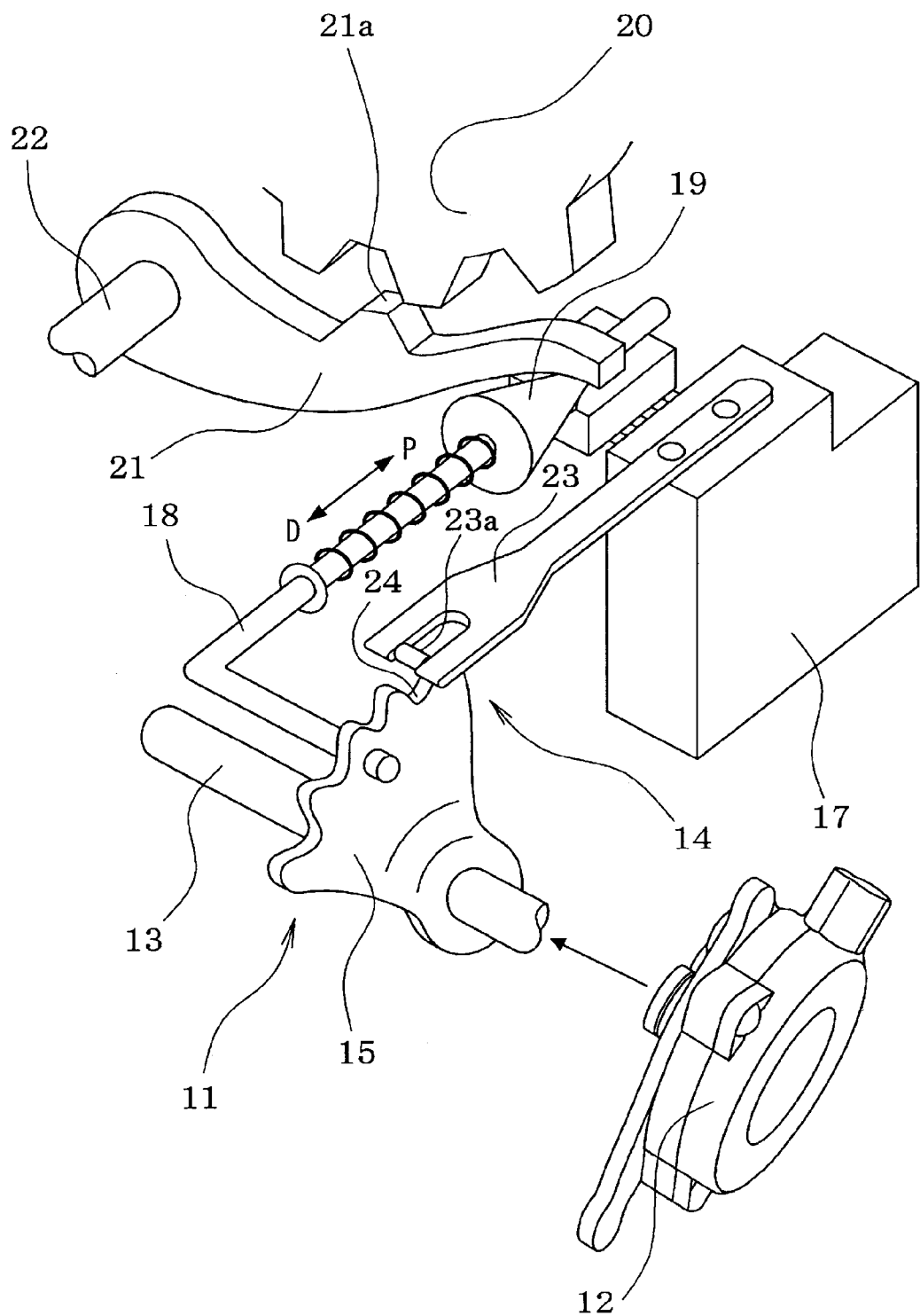
FIG. 1 is a perspective view of a range switching device.
Figure 2:
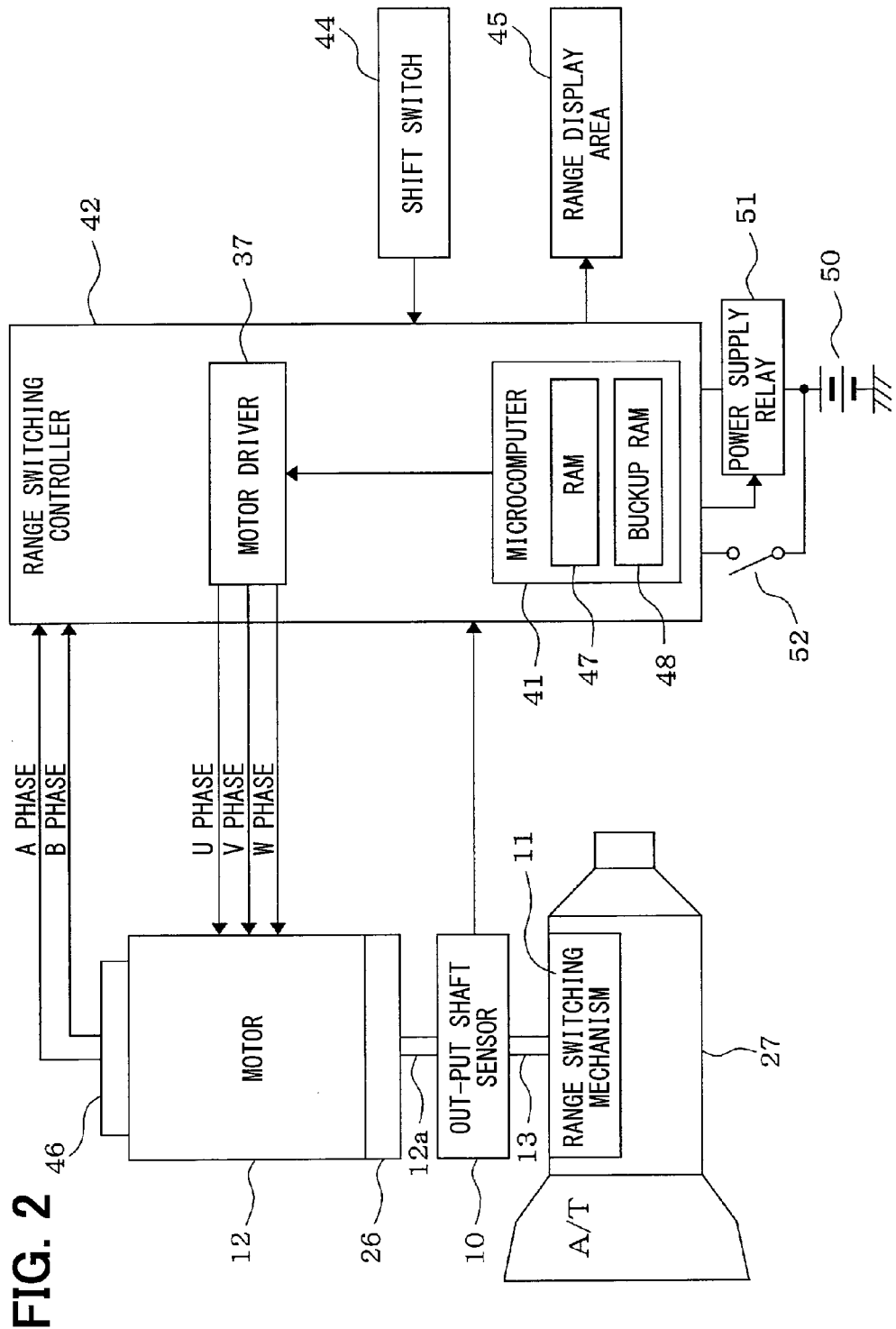
FIG. 2 is a block diagram of a control system of the range switching device.

As shown in FIG. 1, the range switching mechanism 11 is a 4-position type range switching mechanism for switching a shift range of an automatic transmission 27 (see FIG. 2) among four positions, which may include a parking range (i.e., a P range), a reverse range (i.e., an R range), a neutral range (i.e., an N range), and a drive range (i.e., a D range). The motor 12 may be a switched-reluctance motor, for example, which may be used to drive the range switching mechanism 11 to switch a shift range between one of the plurality of the shift ranges. As shown in FIG. 2, the motor 12 has a built-in deceleration mechanism 26. The motor 12 is also attached to an output-shaft sensor 10 for detecting a rotation position of an output shaft 12a. The output shaft 12a of the motor 12 is connected to a manual shaft 13 and a detent lever 15 is attached to the manual shaft 13.

The detent lever 15 is connected to a manual valve (not shown) which performs a linear motion according to a rotation of the detent lever 15. The shift range is changed by switching an internal hydraulic circuit (not shown) of the automatic transmission 27 with the manual valve.

A parking rod 18 is formed in an L-shape and fixed onto the detent lever 15. A cone body 19 is provided at a tip part of the parking rod 18 and in contact with a locking lever 21. According to the position of the cone body 19, the locking lever 21 moves (i.e., rotates) up and down centering on the shaft 22 to lock and unlock a parking gear 20. The parking gear 20 is disposed on the output axis of the automatic transmission 27, and when the parking gear 20 is locked by the locking lever 21, the driving wheels of the vehicle are held in a locked state (i.e., a parking state) in which the wheels are prevented from rotating.

A detent spring 23 is fixed on a support base 17 and holds the detent lever 15 in each of the P, R, N, and D ranges. The detent lever 15 has a range detention concave part 24 (see FIG. 1) for each of the P, R, N, and D range, and, when an engagement part 23a provided at the tip of the detent spring 23 is engaged with one of the range detention concave parts 24, the detent lever 15 is held in the position of each of those ranges. In combination, the detent lever 15 and the detent spring 23 serve as the detent mechanism 14 (i.e., a detent) to engage and hold the rotation position of the detent lever 15 within one of the four ranges (i.e., a device for holding the range switching mechanism 11 at one of the plural range positions).

In the P range, the parking rod 18 moves closer to the locking lever 21 such that a thick portion of the cone body 19 pushes the locking lever 21 upward. In turn, a convex part 21a of the locking lever 21 engages the parking gear 20 to lock the parking gear 20 and hold the output shaft (i.e., the driving wheels) of the automatic transmission 27 in a locked state (i.e., the parking state of the vehicle).

In the R, N, and D ranges, the parking rod 18 moves away from the locking lever 21 such that the thick portion of the cone body 19 is pulled out from below the locking lever 21. In turn, the locking lever 21 moves downward and the convex part 21a of the locking lever 21 moves away from the parking gear 20 to release the lock of the locking lever 21. As a result, the output shaft of the automatic transmission 27 is held in a rotatable state (i.e., a travelable state of the vehicle).

Further, the output-shaft sensor 10 mentioned above includes a rotation sensor (e.g., a potentiometer) which outputs a voltage according to the rotation angle of the output shaft 12a of the deceleration mechanism 26 of the motor 12. In addition, which of the P, R, N and D ranges for shifting into is confirmed based on the output voltage. Further, if no output-shaft sensor 10 is provided, an encoder 46 confirms which one of the P, R, N and D ranges is the actual shift range.

As shown in FIG. 2, the encoder 46 is provided in the motor 12 to detect the rotation angle (i.e., a rotation position) of a rotor. The encoder 46 is configured to sense a rotation of the motor 12 and output a pulse signal in synchronization with the rotation of the motor 12. More specifically, the encoder 46 is implemented as a magnetic type rotary encoder, for example, and is configured to output a pulse signal of an A phase and a pulse signal of a B phase that is in synchronization with the rotation of the rotor of the motor 12. The encoder 46 outputs the pulse signal to a range switching controller 42 at every predetermined angle. The microcomputer 41 of the range switching controller 42 counts both a rising edge and a falling edge of the A phase signal and the B phase signal, which are then outputted from the encoder 46 as a count value. The motor 12 is rotated based on the switching of the power supply phases of the motor 12 in a given order by a motor driver 37 according to the count value (hereinafter encoder count value). Further, two systems (i.e., two combinations) of three-phase (U, V, W phase) windings of the motor 12 and the motor driver 37 may be provided for the contingency operation of the motor 12. That is, operation of the motor 12 may continue through the use of one functioning system even despite the malfunctioning of the other of the two systems.

During the rotation of the motor 12, a rotation direction of the motor 12 is determined based on an order of generating the A phase signal and the B phase signal. The encoder count value is counted upward when the rotation direction is determined as a positive rotation (i.e., a rotation direction from the P range toward the D range), and the encoder count value is counted downward when the rotation direction is determined as a reverse rotation (i.e., a rotation direction from the D range toward the P range). Since the correspondence between the encoder count value and the rotation angle of the motor 12 is maintained in both of the two rotation directions of the motor 12, the rotation of the motor 12 in both of the two rotation directions is controllable by the power supply for the winding in a corresponding phase that corresponds to the rotation position of the motor 12 based on the rotation position detected by the encoder count value.

A signal of a shift lever operation position (hereinafter referred to as "shift lever position signal") detected by the shift switch 44 is input to the range switching controller 42. According to such input, that is, according to the driver's operation of the shift lever, the microcomputer 41 (i.e., a controller) of the range switching controller 42 switches a target shift range, and drives the motor 12 according to the target shift range and causes the range switching mechanism to switch the shift range to the target shift range. After the switching of the shift ranges (i.e., after the switching operation), the controller 42 displays the actual shift range on a range display area 45 that is disposed on an instrument panel (not shown).

A power supply voltage is supplied for the range switching controller 42 via a power supply relay 51 from a battery 50 (i.e., a power supply) in the vehicle. The ON and OFF of the power supply relay 51 are switched by manually operating/switching an IG switch 52 ON and OFF (i.e., an ignition switch) which is an electric power switch. When the IG switch 52 is turned ON, the power supply relay 51 is turned ON and the power supply voltage is supplied for the range switching controller 42. When the IG switch 52 is turned OFF, the power supply relay 51 is turned OFF and the power supply for the range switching controller 42 is interrupted (i.e., is turned OFF).

In this case, since the encoder count value is stored in RAM 47 of the microcomputer 41, when the power supply for the range switching controller 42 is turned OFF, a memory of the encoder count value is lost. Therefore, the encoder count value immediately after the turning ON of the range switching controller 42 may not correspond to the actual rotation position (i.e., the power supply phase) of the motor 12. Thus, in order to properly switch the power supply phases according to the encoder count value, it is necessary for the encoder count value to correspond to the actual rotation position of the motor 12 after the turning ON of the power supply, for the correspondence between the encoder count value and the power supply phase.

Therefore, the microcomputer 41 performs a learning process in which a correspondence between the power supply phase of the motor 12 and the encoder count value is learned, in an initial drive after the turning ON of the power supply. In such an initial drive, the switching of the power supply phases of the motor 12 is performed for one rotation by the open-loop control at a scheduled timing, so that the correspondence between the rotation position of the motor 12 and the power supply phase of the motor 12 is matched in one of the power supply phases, for the driving of the motor 12 and for counting the edges of the A phase signals and the B phase signals of the encoder 46. In such manner, by the time of ending the initial drive, the correspondence between (i) the encoder count value, (ii) the rotation position of the motor 12, and (iii) the power supply phase is learned.

Further, since the microcomputer 41 can only detect an amount of rotation (i.e., a rotation angle) from a start position of the motor 12 based on the encoder count value after starting of the motor 12, an absolute rotation position (i.e., a reference position) must be detected by after the turning ON of the motor 12, in order to accurately rotate the motor 12 to the target rotation position.

Therefore, after ending the initial drive, the microcomputer 41 performs a limit position control in which the motor 12 is rotated until the range switching mechanism 11 (more specifically, the engagement part 23a of the detent spring 23) abuts against a limit position of a movable range of the range switching mechanism 11. The microcomputer 41 learns (i.e., recognizes or establishes) the rotation position of the motor 12 as "the reference position" when the switching mechanism 11 abuts against the limit position. Using the encoder count value corresponding to the learned reference position, the microcomputer 41 controls the amount of rotation (i.e., the rotational angle) of the motor 12.

More specifically, the microcomputer 41 performs "a first limit position control" in which the motor 12 is rotated until the engagement part 23a of the detent spring 23 abuts against a P range wall (i.e., a side wall of the P range detention concave part 24), which defines a first limit position of the switching mechanism 11 that is the limit position corresponding to the P range. The microcomputer 41 learns (i.e., assigns or establishes) the rotation position of the motor 12 as the reference position when the engagement part 23a abuts against a P range wall (i.e., the switching mechanism 11 abuts against the first limit position). Further, the microcomputer 41 may perform a "second limit position control" in which the motor 12 is rotated until the engagement part 23a of the detent spring 23 abuts against a D range wall (i.e., the range opposite to the P range), which defines a second limit position of the switching mechanism 11 that is the limit position corresponding to the D range. The microcomputer 41 learns (i.e., assigns or establishes) the rotation position of the motor 12 as the reference position when the engagement part 23a abuts against a D range wall (i.e., the switching mechanism 11 abuts against the second limit position).

After learning the reference position, when the target shift range is selected by manipulation of a shift lever by a driver, the microcomputer 41 changes a target rotation position (i.e., a target count value) according to the selected target shift range and performs a feedback control. Under the feedback control, the motor 12 is rotated to the target rotation position by sequentially switching the power supply phases based on the encoder count value. As a result, the shift range is switched to the target shift range (i.e., the position of the range switching mechanism 11 is switched to the target shift range).

When the target shift range is switched (i.e., the shift range switched by a manipulation of the shift lever), the microcomputer 41 updates and stores the newly switched target shift range in a backup RAM 48. The backup RAM 48 is a rewritable nonvolatile memory that can retain stored data even after the microcomputer is reset. In this case, both of a present value and a previous value of the target shift range may be stored in the backup RAM 48. Furthermore, when the switching of the shift range is complete, the switched shift range may be updated and stored in the backup RAM 48 as "an actual range".

When the microcomputer 41 is reset due to, for example, a momentary voltage drop, signal noise, or the like during a switching operation of the shift range, the encoder count value and the reference position stored in the RAM 47 is also reset. Furthermore, after the reset, the encoder count value is not counted (i.e., stored) for the rotation of the motor 12 during restarting of the microcomputer 41. Therefore, the rotation position of the motor 12 is unknown at the restart of the microcomputer 41, so that it may be impossible to restart the switching of the shift range (i.e., controlling the motor 12).

Figure 5:
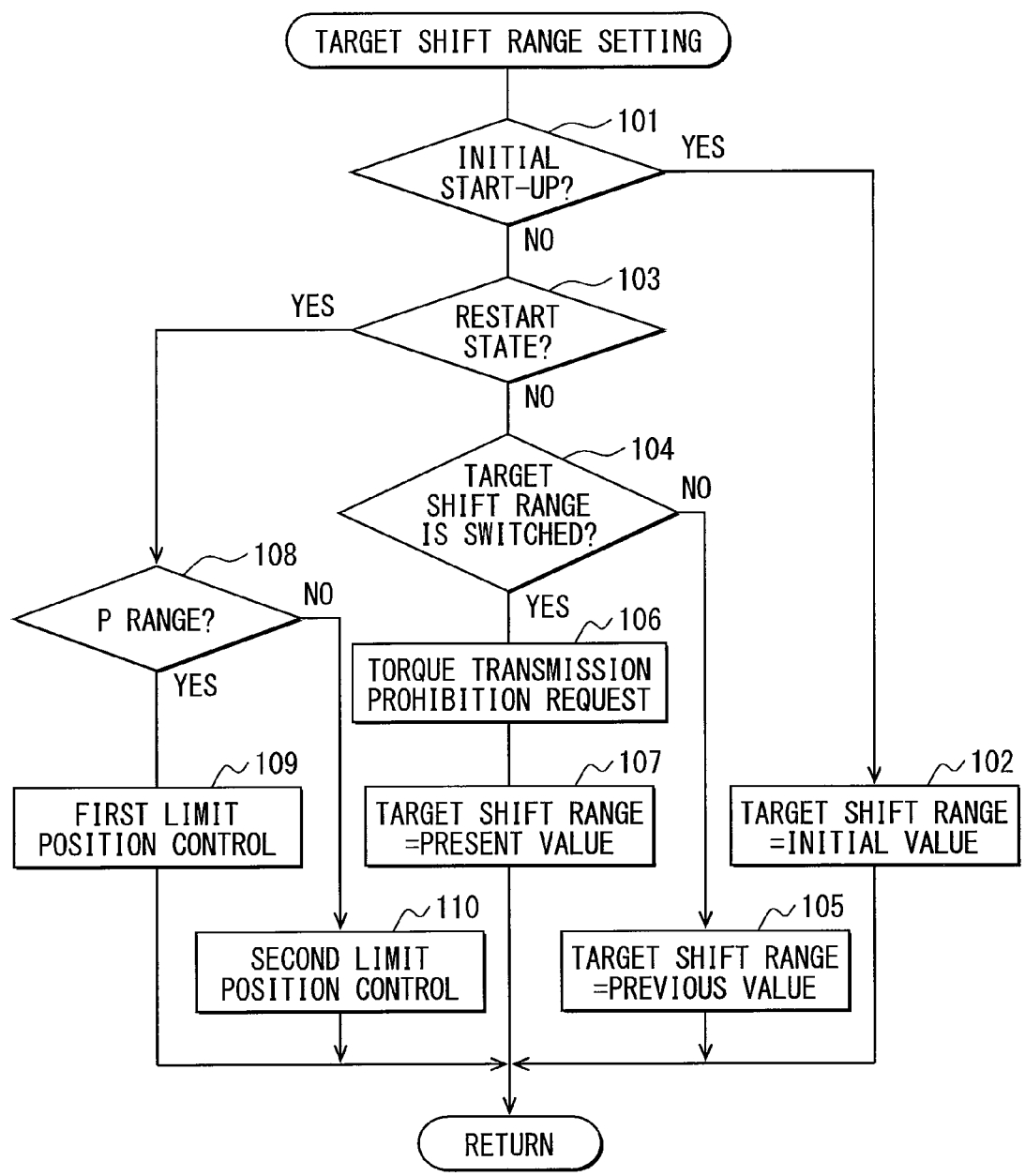
FIG. 5 is a flowchart of a target shift range setting routine.

According to the present embodiment, however, the microcomputer 41 of the range switching controller 42 is configured to execute a routine, as shown in FIG. 5. Namely, the microcomputer 41 performs the first or second limit position control to learn the reference position of the motor 12 when the microcomputer 41 is reset and restarted during the switching operation of the shift range.

However, when the microcomputer 41 is reset and restarted during the switching operation of the shift range and performs the first or second limit position control without considering the shift range before and after being switched, the vehicle may behave contrary to an intention of the driver and give uncomfortable feeling to the driver.

Specifically, for example, when the microcomputer 41 is reset and restarted during the switching operation of the shift range from the D range to the P range, and the microcomputer 41 performs the second limit position control, the shift range is temporarily switched to the D range. Therefore, the vehicle may be driven contrary to an intention of the driver.

Whereas, when the microcomputer 41 is reset and restarted during the switching operation of the shift range from the D range to the N range, and performs the first limit position control, the shift range is temporarily switched to the P range. Therefore, the vehicle may stop contrary to an intention of the driver.

According to the present embodiment, however, when the microcomputer 41 is reset and restarted during the switching operation of the shift range, the microcomputer 41 determines which of the first or second limit position control should be performed considering the shift range before and after being switched. In other words, the microcomputer 41 sets the limit position to either one of the first limit position corresponding to the P range (i.e., the P range wall) or the second limit position corresponding to the D range (i.e., the D range wall) based on the shift range before and after being switched.

Figures 3, 4:
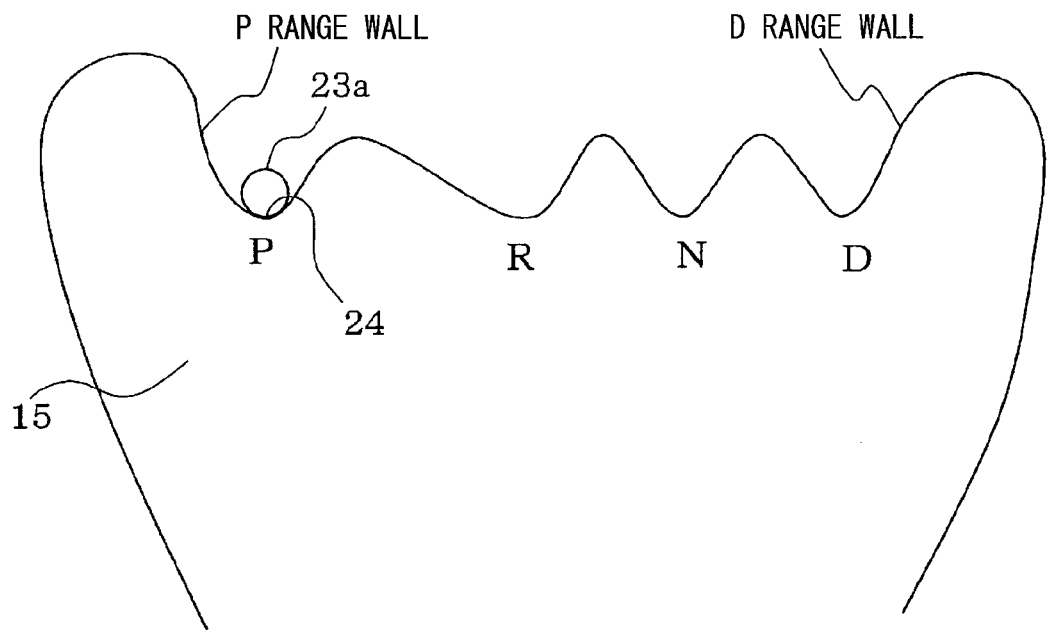
FIG. 3 is a schematic diagram illustrating a range detention concave part of a detent lever and peripheral parts of the recesses.
FIG. 4 is a chart illustrating a relationship between a set limit position and shift ranges before and after switching.

More specifically, as shown in FIG. 4, when the microcomputer 41 is reset and restarted during the switching operation of the shift range, and when the shift range before or after being switched is the P range (i.e., one of the shift ranges before and after being switched is the P range), the P range wall (i.e., the first limit position) corresponding to the P range is set as the limit position against which the engagement part 23a abuts. Then, the microcomputer 41 performs the first limit position control to learn the reference position of the motor 12. As a result, it is possible to prevent the vehicle from being driven contrary to an intention of the driver during the switching operation of the shift range (i.e., the vehicle is prevented from being temporarily in an unintended shift range).

Whereas, when the microcomputer 41 is reset and restarted during the switching operation of the shift range, and when the shift range before and after being switched are the ranges other than the P range (i.e., both of the shift ranges before and after being switched are the ranges other than the P range), the D range wall (i.e., the second limit position) corresponding to the D range is set as the limit position against which the engagement part 23a abuts. Then, the microcomputer 41 performs the second limit position control to learn the reference position of the motor 12. As a result, it is possible to prevent the vehicle from stopping contrary to an intention of the driver during the switching operation of the shift range (i.e., the vehicle is prevented from being temporarily in an unintended shift range).

Furthermore, according to the present embodiment, during the switching operation of the shift range, a request (hereinafter referred to as a "torque transmission prohibition request") not to transmit torque from an engine (i.e., a vehicle power source) to the wheels is output. In this case, by setting the automatic transmission 27 to a neutral state, for example, the torque from the engine is not transmitted to the wheels. Otherwise, by releasing a clutch provided in a transmitting passage for transmitting the torque from the engine to the wheels, the torque of the engine may not be transmitted to the wheels.

Next, the process of a routine (hereinafter referred to as a "target shift range setting routine") performed by the microcomputer 41 will be described referring to FIG. 5.

While the power of the range switching controller 42 is set to ON, the target shift range setting routine is repeated by the microcomputer 41 at a given cycle. In Step 101, when the process of the routine starts, whether the microcomputer 41 is in an initial start-up state (i.e., an initial start-up of the microcomputer 41 after turning on) is determined. When the microcomputer 41 is in the initial start-up state, the process proceeds to Step 102 and the target shift range stored in the backup RAM 48 (i.e., a stored value) is set to an initial value (the P range, for example).
Target Value=Initial Value Whereas, when the microcomputer 41 is not in the initial start-up state in the Step 101, the process proceeds to Step 103, and whether the microcomputer 41 is in a restart state (i.e., a state that the microcomputer 41 is reset and restarted during the switching operation of the shift range) is determined.

When the microcomputer 41 is not in the restart state in the Step 103, the process proceeds to Step 104, and the microcomputer 41 determines whether the target shift range is switched based on the shift lever position signal detected by the shift switch 44. In this case, whether the target shift range is switched may be determined based on whether the present value of the target shift range selected by the shift lever manipulation is different from the previous value. Further, whether the target shift range is switched may be determined based on whether the present value of the target shift range selected by the shift lever manipulation is different from the target value stored in the backup RAM 48 (i.e., the stored value).

When the target shift range is not switched in the Step 104, the process proceeds to Step 105, and the target shift range stored in the backup RAM 48 is maintained in the previous value.
Target Value=Previous Value When the target shift range is switched in the Step 104, the microcomputer 41 determines that the shift range is being switched, and the process proceeds to Step 106. In the Step 106, the torque transmission prohibition request not to transmit the torque from the engine to the wheels is output.

Next, the process proceeds to Step 107, and the target shift range stored in the backup RAM 48 (i.e., the stored value) is updated to the present value (i.e., the target shift range selected by the shift manipulation).
Target Value=Present Value Whereas, when the microcomputer 41 is in the restart state in the Step 103, the process proceeds to Step 108, and the microcomputer 41 determines whether the shift range before or after being switched is the P range (i.e., one of the shift ranges before and after switching is the P range). In this case, the previous value of the target value stored in the backup RAM 48 may be adopted as the shift range before being switched and the present value of the target value stored in the backup RAM 48 may be adopted as the shift range after being switched. Otherwise, the actual range stored in the backup RAM 48 may be adopted as the shift range before being switched.

When the shift range before or after being switched is the P range, the process proceeds to Step 109. In the Step 109, under the first limit position control (i.e., setting of the limit position to the first limit position), the microcomputer 41 sets the limit position to the P range wall against which the engagement part 23a of the detent spring 23 abuts and performs the first limit position control. The microcomputer 41 learns the reference position of the motor 12 when the first limit position control is finished (i.e., the range switching mechanism 11 abuts against the first limit position). Therefore, it is possible to prevent the vehicle from being driven contrary to an intention of the driver during the switching operation of the shift range.

Whereas, in Step 108 when the shift ranges before and after being switched are ranges other than the P range (i.e., both of the shift ranges before and after being switched are the ranges other than the P range), the process proceeds to Step 110. In Step 110, under the second limit position control (i.e., set the limit position to the second limit position), the microcomputer 41 sets the limit position to the D range wall against which the engagement part 23a of the detent spring 23 abuts and performs the second limit position control. The microcomputer 41 learns the reference position of the motor 12 when the second limit position control is finished (i.e., the range switching mechanism 11 abuts against the second position). Therefore, it is possible to prevent the vehicle from stopping contrary to an intention of the driver while switching of the shift range.

As described above, according to the present embodiment, when the controller 41 is reset and restarted during the switching operation of the shift range, the controller 41 (i) sets the limit position of a movable range of the range switching mechanism 11 to either of the first limit position corresponding to the P range or the second limit position corresponding to a range that is opposite to the P range (i.e., the D range), based on the shift range before and after being switched, (ii) controls the motor 12 to rotate until the range switching mechanism 11 abuts against the limit position, and (iii) learns the rotation position of the motor 12 as the reference position, when the range switching mechanism 11 abuts against the limit position.

More specifically, when the microcomputer 41 is reset and restarted during the switching operation of the shift range, the microcomputer 41 performs the first limit position control or the second limit position control to learn the reference position of the motor 12. As such, even when the microcomputer 41 is reset and started during the switching operation of the shift range, the amount of rotation (i.e., the rotational angle) can be properly controlled based on the reference position learned by the limit position control. As a result, it is possible to restart switching of the shift range (i.e., controlling the motor 12).

When the microcomputer 41 is reset and restarted during the switching operation of the shift range, and when the shift range before or after being switched is the P range, the limit position is set to the first limit position (i.e., the P range wall) against which the engagement part 23a of the detent spring 23 abuts, and the microcomputer 41 performs the first limit position control. Whereas, when the shift ranges before and after being switched are the ranges other than the P range, the limit position is set to the second limit position (i.e., the D range wall) against which the engagement part 23a of the detent spring 23 abuts, and the microcomputer 41 performs the second limit position control. Therefore, it is possible to prevent the vehicle from behaving contrary to an intention of the driver and prevent the driver from being uncomfortable.

Furthermore, according to the present embodiment, since the torque transmission prohibition request not to transmit the torque from the engine to the wheels is output, it is possible to prevent the vehicle from driving in an unintended direction by the driver even when the microcomputer 41 is reset during the switching operation of the shift range.

In the above-described embodiment, the magnetic encoder is used as the encoder 46. However, other types of encoders such as an optical-type encoder or a brush-type encoder may also be used as the encoder 46, for example. Further, the encoder 46 is not necessarily limited to a signal encoder that outputs A phase signals and B phase signals. That is, the encoder 46 may be a signal encoder that also outputs a Z phase signal, which is used for correction, in addition to the A phase signal and the B phase signal.

Further, in the above-mentioned embodiment, the motor 12 may be a switched reluctance motor (i.e., an SR motor). However, as long as the motor is a brushless type synchronous motor which detects the rotation position of the motor based on the count value of the encoder output and sequentially switches the power supply phase of the motor, other types of brushless type synchronous motors may also be used.

Further, in the above-mentioned embodiment, the present disclosure is applied to a system that has a range switching mechanism which switches a shift range between four ranges, i.e., among the P, R, N, and D ranges. However, the present disclosure may also be applied to a system that has a range switching mechanism other than the above. That is, for example, the present disclosure may be applicable to a system which switches a shift range between two ranges, i.e., between a P range and a non-P range. The present disclosure may further be applicable to a system of three ranges, or to a system of five or more ranges.

Further, the present disclosure is not necessarily limited to the automatic transmission (AT, CVT, DCT, etc.). That is, various changes and modifications may be included within the scope of the present disclosure. In other words, the range switching device for switching of the shift range of the speed reducer of an electric vehicle or the like may also be included in the scope of the invention.

Such changes and modifications are to be understood as being within the scope of the present disclosure as defined by the appended claims.

What is claimed is:
1. A range switching device, comprising:
a range switching mechanism that switches a shift range between a plurality of shift ranges including a P range;
a motor driving the range switching mechanism to switch the shift range;
an encoder sensing a rotation of the motor and outputting a pulse signal in synchronization with the rotation of the motor; and
a controller that controls the motor to be rotated to a rotation position corresponding to a target shift range based on a count value of the outputted pulse signal of the encoder and causes the range switching mechanism to switch the shift range to the target shift range, wherein
when the controller is reset and restarted during a switching operation of the shift range, the controller (i) sets a limit position of a movable range of the range switching mechanism to either of a first limit position corresponding to the P range or a second limit position corresponding to a range opposite to the P range, based on the shift range before and after being switched, (ii) controls the motor to rotate until the range switching mechanism abuts against the limit position, and (iii) learns the rotation position of the motor as a reference position when the range switching mechanism abuts against the limit position.

2. The range switching device according to claim 1, wherein,
when the controller is reset and restarted during the switching operation of the shift range, and when the shift range before or after being switched is the P range, the controller sets the limit position to the first limit position and controls the motor to rotate until the range switching mechanism abuts against the first limit position.

3. The range switching device according to claim 1, wherein
when the controller is reset and restarted during the switching operation of the shift range, and when the shift ranges before and after being switched are the ranges other than the P range, the controller sets the limit position to the second limit position and controls the motor to rotate until the range switching mechanism abuts against the second limit position.

4. The range switching device according to claim 1, wherein
during the switching operation of the shift range, the controller outputs a request not to transmit torque from a vehicle power source to a wheel.

* * * * *